(12) United States Patent  
Goodson et al.

(10) Patent No.: US 9,135,614 B2  
(45) Date of Patent: Sep. 15, 2015

(54) SYSTEM AND METHOD FOR MANAGING ISSUANCE OF FINANCIAL ACCOUNTS

(75) Inventors: Louis Goodson, San Francisco, CA (US); David Meaney, San Francisco, CA (US)

(73) Assignee: VISA U.S.A. INC., San Francisco, CA (US)

( * ) Notice: Subject to any disclaimer, the term of this patent is extended or adjusted under 35 U.S.C. 154(b) by 781 days.

(21) Appl. No.: 12/685,769

(22) Filed: Jan. 12, 2010

(65) Prior Publication Data

US 2011/0173123 A1  Jul. 14, 2011

(51) Int. Cl.
*G06Q 20/00* (2012.01)
*G06Q 20/24* (2012.01)
*G06Q 20/22* (2012.01)
*G06Q 20/38* (2012.01)
*G06Q 40/00* (2012.01)
*G06Q 40/02* (2012.01)

(52) U.S. Cl.
CPC .............. *G06Q 20/24* (2013.01); *G06Q 20/227* (2013.01); *G06Q 20/382* (2013.01); *G06Q 40/00* (2013.01); *G06Q 40/02* (2013.01)

(58) Field of Classification Search
USPC .............. 705/67, 16, 21, 59, 71; 380/44, 262, 380/278, 279
See application file for complete search history.

(56) References Cited

U.S. PATENT DOCUMENTS

| | | | |
|---|---|---|---|
| 2002/0116344 A1* | 8/2002 | Kinoshita et al. | 705/65 |
| 2002/0129200 A1* | 9/2002 | Arakawa et al. | 711/112 |
| 2004/0208164 A1* | 10/2004 | Keenan et al. | 370/352 |
| 2007/0192199 A1* | 8/2007 | Simpson et al. | 705/26 |
| 2007/0242670 A1* | 10/2007 | Simonson et al. | 370/390 |
| 2009/0099965 A1* | 4/2009 | Grant, IV | 705/41 |
| 2009/0125429 A1* | 5/2009 | Takayama | 705/35 |
| 2009/0234742 A1* | 9/2009 | Hart | 705/14 |

* cited by examiner

*Primary Examiner* — Dante Ravetti
(74) *Attorney, Agent, or Firm* — Kilpatrick Townsend & Stockton LLP

(57) ABSTRACT

A system for managing issuance of a corporate meeting account for use in making purchases related to a meeting. The system comprises a communication interface adapted to communicate with a client computer executing an event management software and with a computer from each issuer, a processor coupled to the communication interface, and a management module executable by the processor. The management module receives, through the communication channel, a request to issue a financial account related to the meeting from the event management software. The request includes an issuer identifier and meeting account parameters. The management module generates an account issuance message and transmits the message to a computer of the issuer identified by the issuer identifier. This way, the process of opening a financial account associated with a meeting event is automatically done without having to manually contact the issuer.

11 Claims, 5 Drawing Sheets

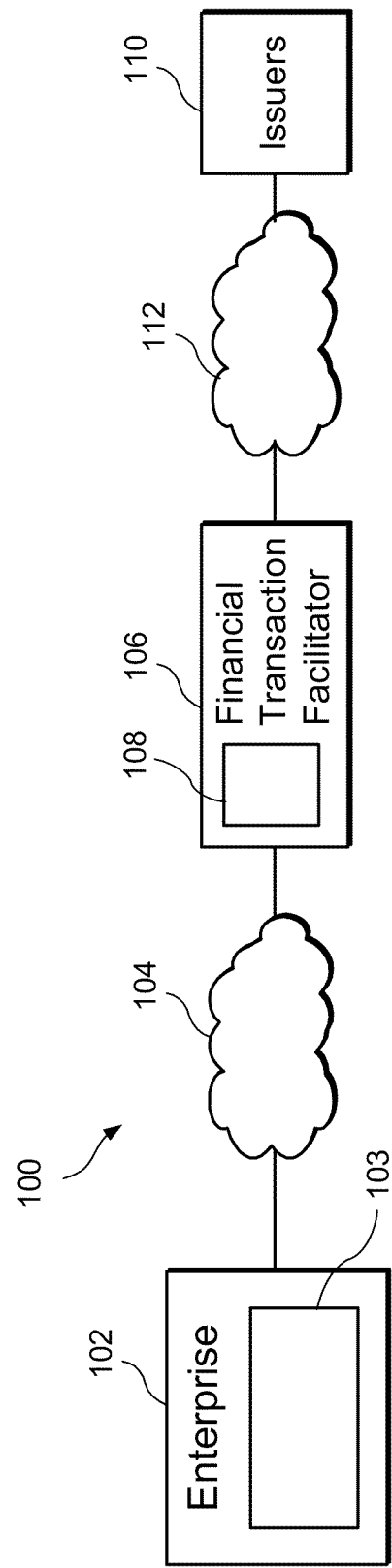
F I G. 1

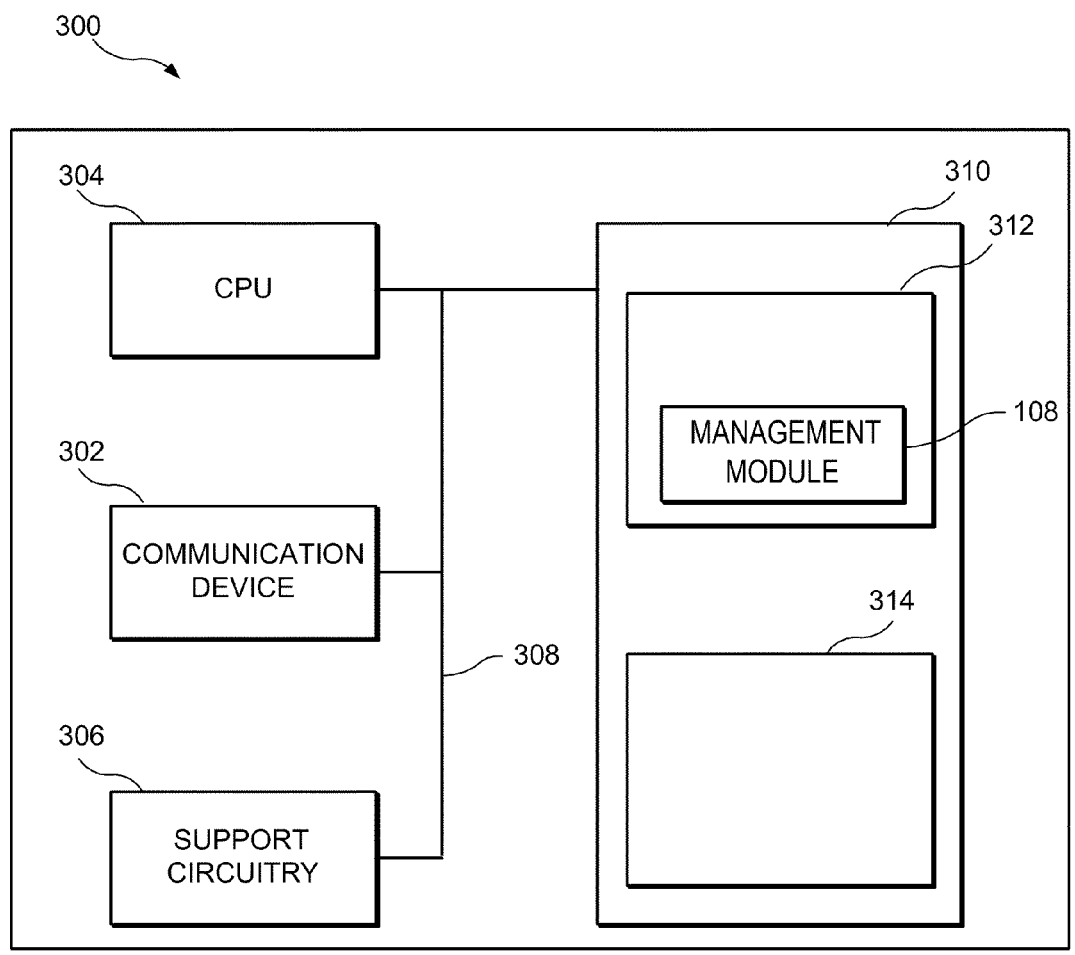
F I G. 3

| Issuer ID | Company ID | Requester Name | Company Address | # of Cards Requested |
|---|---|---|---|---|
| Credit Limit | Cash Advance Limit | Velocity Limit | Authorized User 1 | Authorized User 2 |

FIG. 5

SYSTEM AND METHOD FOR MANAGING ISSUANCE OF FINANCIAL ACCOUNTS

FIELD OF THE INVENTION

The present invention relates to data processing, and in particular relates to a system and method for managing issuance of a corporate meeting account for use in making purchases related to a meeting.

BACKGROUND OF THE INVENTION

In the continued drive to cut costs, companies and firms have employed software tools to manage and monitor various types of expenditures. For example, to manage expenditures for corporate meetings and conferences, software packages have been developed that allow managers to set departmental budgets for specific meeting events, track employee expenditures, allocate expenditures against the budgets and perform reconciliation. In addition, to further promote control over expenditures for meetings, issuers of financial presentation devices have now issued meeting accounts (e.g., meeting cards) which may have preset expenditure limits and be authorized for purchases only through specified vendors.

To set up a meeting event, a manager would use a meeting management software program to enter the details of the meeting event. Thereafter, the manager would contact the issuer of a meeting card to request a meeting card account. When the account details are provided by the issuer, the manager would then enter the information to associate that card account to the meeting event. The manual process of contacting the issuer to request a meeting card and then associating it to a meeting event is time consuming and cumbersome, and may lead to errors.

It would therefore be desirable to provide a platform that could interact with third party software platforms and the issuer of the meeting card in an integrated and automated manner.

SUMMARY OF THE DISCLOSURE

In one aspect, the present invention provides a system for managing issuance of a financial account such as a corporate meeting account for use in making purchases related to a meeting. The system comprises a communication interface adapted to communicate, over a communication channel, with a client computer executing an event management software and computers from multiple issuers of financial accounts, a processor coupled to the communication interface, and a management module executable by the processor and adapted to communicate with the client computer through the communication interface. When the management module receives, through the communication channel, a request to issue the financial account from the event management software being executed on the client computer, wherein the request includes an issuer identifier and meeting account parameters, it sends the received request to the issuer identified by the issuer identifier so as to automate the process of requesting the financial account without the need for the event management software to be knowledgeable about the transmission format and protocol, and encryption keys of various issuers.

BRIEF DESCRIPTION OF THE DRAWINGS

FIG. 1 is a block diagram of an integrated system for meeting card management according to an embodiment of the present invention.

FIG. 3 is a block diagram of a computer system for implementing a card management application module according to an embodiment of the present invention is shown.

FIG. 5 shows exemplary data that may be included in an exemplary SOAP message requesting issuance of a meeting card according to an embodiment of the present invention.

DETAILED DESCRIPTION OF THE INVENTION

Figure 2:
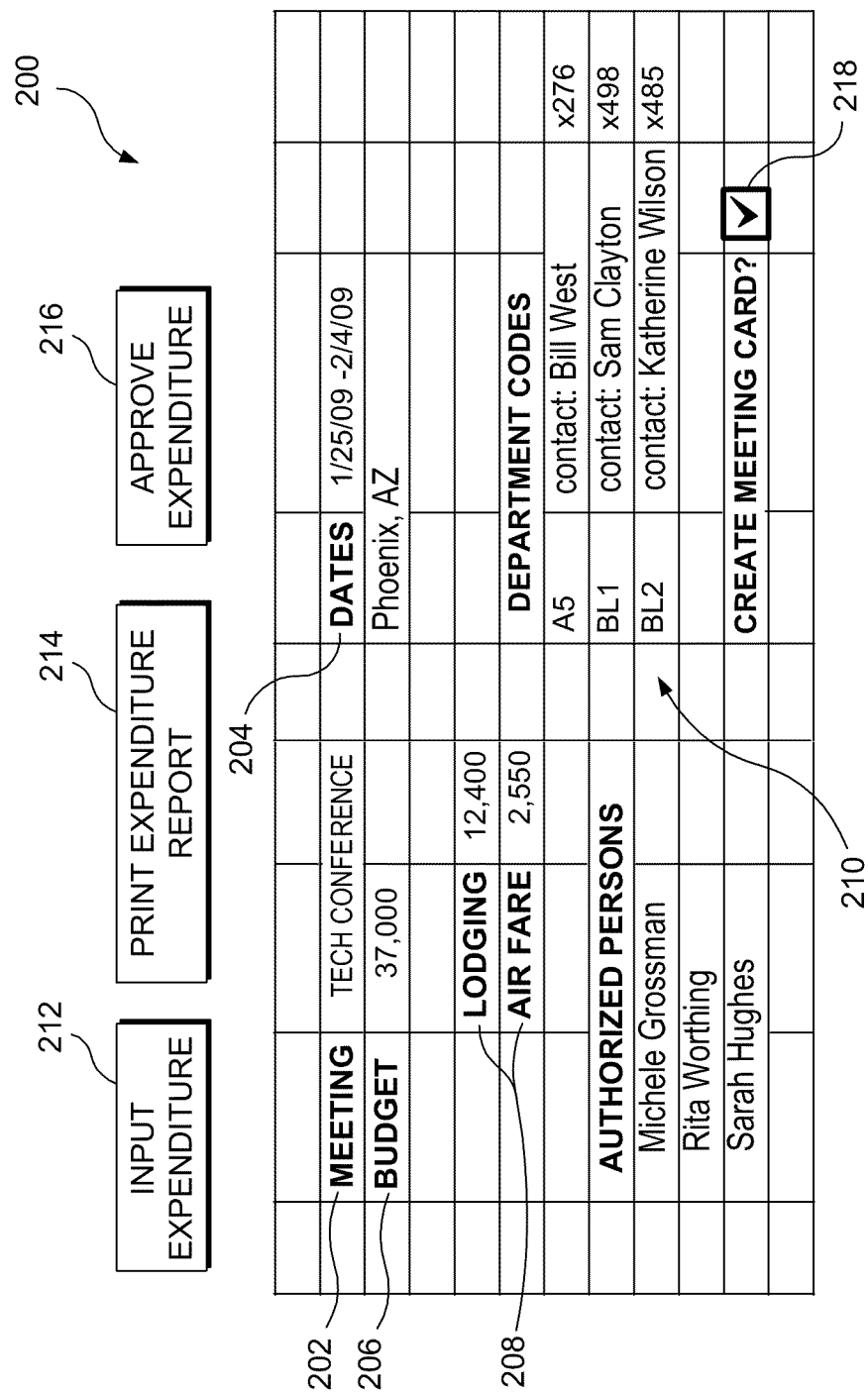
FIG. 2 is a block diagram of an exemplary user interface screen of a meeting planning application.

A financial presentation device is a device that can be presented to sellers of goods or services for payment, and includes, but are not limited to, credit cards, debit cards, prepaid cards, electronic benefit cards, charge cards, virtual cards, smart cards, key chain devices, personal digital assistants, cell phones, stored value devices and the like. The term 'meeting account' is any financial account or financial presentation device presentable by a customer to a merchant as a payment mechanism to perform a transaction. As such, a meeting account may be implemented with a tangible article such as a credit card or debit card, or by intangible information, such as by an account number.

Enterprises such as corporations and firms often employ applications and platforms to manage expenditures. For example, enterprises can now manage supply procurement with multiple vendors through the Ariba™ platform. Another trend that is emerging is the use of event-planning software packages, such as the Metron™ application provided by Arcaneo' Inc. of Toronto, Canada, to manage enterprise meeting events. Such software packages allow meeting planners to set up, plan, organize and conveniently manage budgets and expenditures for meetings and conferences. For example, in a meeting planning process, administrators may allocate budgets, and authorize certain employees to make purchases related to meetings. To improve expenditure control and accounting, planners often find it convenient to obtain event-specific corporate meeting accounts that the authorized employees can use to make purchases according to the spending limits and conditions set by the administrator. However, the procurement of corporate meeting accounts has conventionally been a manual process which has been separate from the planning and configuration processes that can be handled through the event-planning software platforms. For example, in one conventional method, the planner fills out a new account request form which is faxed to the issuer. When the issuer communicates the details of the meeting account including the account number, the planner enters the information into the meeting planning software to link the account to a particular meeting event.

As a result, the manual process of contacting the issuer to request a meeting account (typically in the form of a credit card) and then associating it to a meeting event has been time consuming and cumbersome, and some times led to errors.

To overcome these problems, the present invention provides an application program module that enables third-party software platforms such as Metron™ to automatically access and make use of card management functions including financial presentation device procurement and updating functions provided by financial transaction facilitators such as Visa-net™, effectively integrating event-planning processes with corporate meeting account management.

FIG. 1 is a block diagram of an integrated system 100 for meeting account management according to an embodiment of the present invention. System 100 includes a client computer 102, which may be implemented at any enterprise such as a company, firm, non-profit organization, governmental entity, etc. for which meetings and events are planned using a meeting management application 103 executed on the client computer 102. The client computer 102 can also be implemented at a company that licenses the meeting management application 103 to various corporations. As noted previously, meeting management application 103 may comprise an application such as Metron™, which is used, among other purposes to manage meeting budgets and expenditures.

An exemplary user interface screen 200 of meeting management application 103 is shown in FIG. 2. Meeting management administrators may be authorized to use the user interface to set and manage parameters related to planned meetings. The user interface screen 200 includes data for an example meeting including a meeting name 202, meeting dates 204, a budget 206 (e.g., in dollar amount), current expenditures 208, persons authorized to make expenditures for the meeting, and allocation codes 210. Also included in user interface screen 200 are activation boxes including an input expenditure box 212 that allows the user to enter details of an expenditure made for the meeting, a print expenditure report box 214 that provides a printed listing of all current expenditures, and an approve expenditure box 216, that enables an auditor/supervisor to indicate that an expenditure has been approved. If a corporate meeting account has not already been issued for the meeting shown, an option box 218 indicates (e.g., if checked as shown) that a corporate meeting account for the meeting is requested. If a meeting account has already been issued an option box (not shown) may be used to indicate a request to update meeting card information. In one embodiment, user interface screen 200 may be implemented as web pages using conventional HTML and/or XML techniques.

Referring again to FIG. 1, meeting management application 103 executed on client computer 102 transmits requests for issuing or updating corporate meeting accounts over a network 104, such as the Internet, to a financial transaction facilitator 106. Financial transaction facilitator 106 may comprise a financial service network such as Visanet™ which processes financial transactions including purchases made using credit and debit accounts. For the task of receiving and processing corporate meeting account requests from third-party software platforms such as meeting management application 103, financial transaction facilitator 106 provides and executes a card management module 108. As described in greater detail below, the card management module 108 extracts information, including information identifying the requested issuers, from a received card management request, performs a validation process to ensure that the request comes from a trusted source, and formulates a meeting account issuance request which is sent to an account issuer (issuer's computer) 110 over a network 112, which in preferred embodiments is a secure private network. Issuers 110 comprise any entities, such as banks and other financial institutions operative to issue and maintain corporate meeting accounts.

As the transaction facilitator (transaction processor or transaction processing entity) 106 has a relationship with all of the issuers of credit and debit cards including meeting cards, the card management module 108 has a communication protocol and interface as well as encryption keys that accommodates all of the issuers each of which may have a very specific and different protocol. Accordingly, the meeting management application 103 only needs to issue a single standard message to request a meeting account without the need to know anything about the specific communication formats and protocols or encryption keys of individual issuers.

Referring now to FIG. 3, a computer system 300 for implementing a card management module 108 according to an embodiment of the present invention is shown. In the embodiment shown, computer system 300 is implemented by financial transaction facilitator 106 (FIG. 1). Computer system 300 includes a communication device 302 which sends/receives information via a communication channel such as the Internet, a processor 304, such as a central processing unit (CPU), and support circuitry 306. The communication device 302, processor 304, and support circuitry 306 are commonly connected to a bus 308 which also connects to a memory 310. Memory 310 includes program storage memory 312 and data storage memory 314.

Program storage memory 312 and data storage memory 314 may each comprise volatile (RAM) and non-volatile (ROM) memory units and may also comprise hard disk and backup storage capacity. Program storage memory 312 stores application modules and associated data, and in particular stores a card management module 108 according to the present invention and more specifically is adapted to receive, through the communication channel, requests to issue a corporate meeting account from a meeting management application executed on a client computer 102 and to deliver the request to the issuer 110 identified in the request.

In some embodiments, the card management module 108 is implemented as a web service that communicates with the meeting management application 103 using SOAP protocol (Simple Object Access Protocol). The SOAP protocol is used for exchanging structured information and relies on extensible markup language (XML) as its message format. One of the main uses of the SOAP is to enable applications to exchange information over HTTP (hypertext transfer protocol). The SOAP protocol thereby allows applications executed on different operating systems, with different technologies and programming languages to communicate.

It is to be appreciated that the computer system 300 can be any computer such as a personal computer, minicomputer, workstation, mainframe, or a combination thereof. While the computer system 300 is shown, for illustration purposes, as a single computer unit, the system may comprise a group/farm of computers which can be scaled depending on the processing load and database size.

Figure 4:
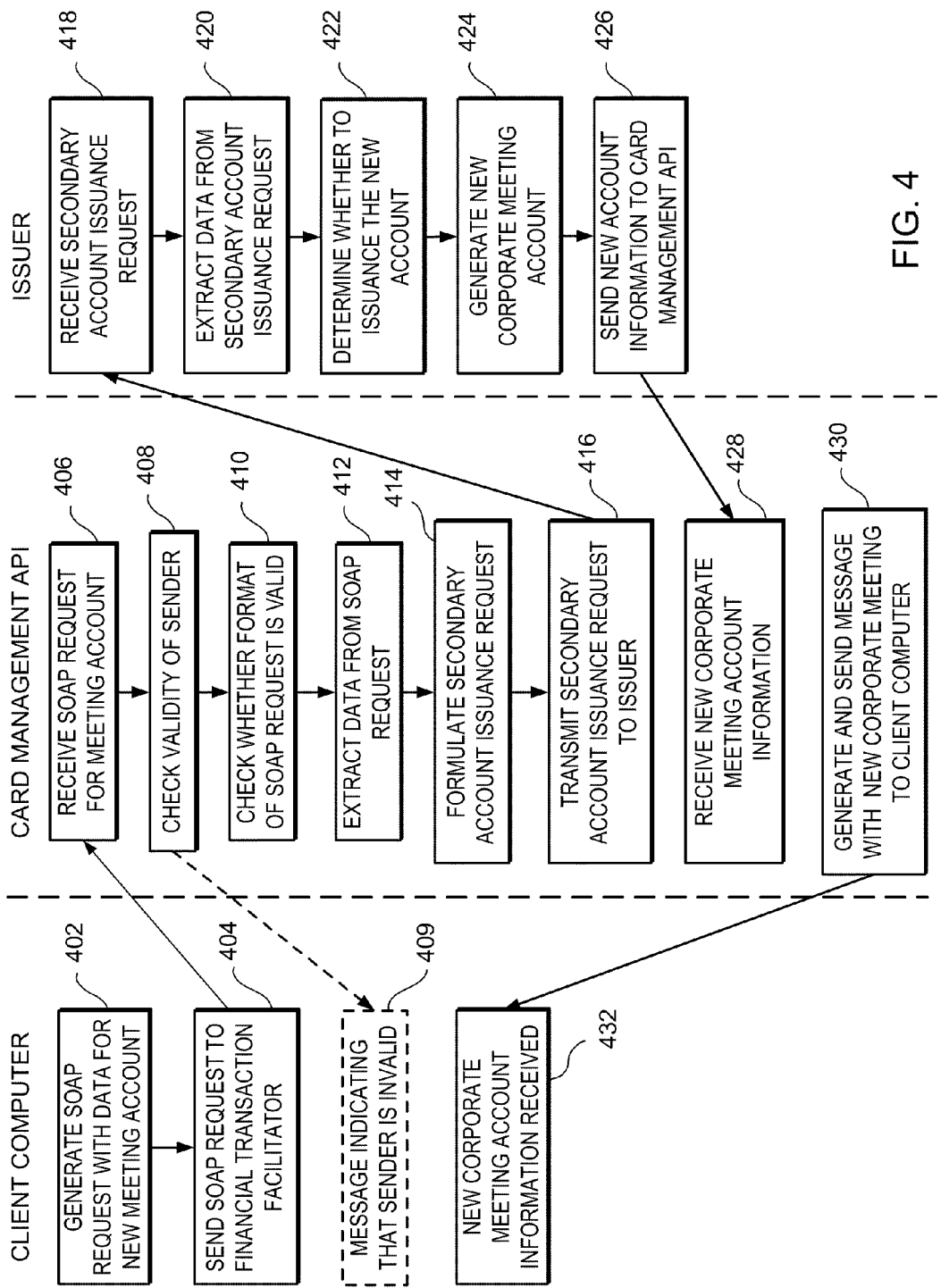
FIG. 4 is a flow diagram of a method for managing issuance of a corporate meeting account for use in making purchases related to a meeting according to an embodiment of the present invention.

FIG. 4 is a flow diagram showing a method 400, performed by the integrated system 100, of issuing or updating a corporate meeting account according to an embodiment of the present invention. In a first step 402, an authorized user at client computer 102 enters meeting information through the user interface 200 of meeting management application 103 and requests issuance of a corporate meeting card for the meeting by clicking on the button 218 (see FIG. 3). In step 404, the meeting management application 103 automatically generates a SOAP request including all data related to the company and the meeting needed for issuance or updating of a corporate meeting account. The SOAP message may accordingly have a complex format including a number of different data fields (requests for issuance and updating will have different formats). FIG. 5 shows an example portion 500 of the data that may be included in an exemplary SOAP card issuance request. The card management request may be formatted so that data fields are distinct as shown in FIG. 5 or may be formatted in other ways. The exemplary request data 500 includes an issuer ID 502 that identifies the issuer from which the client 102 requests a corporate meeting account. The issuer may be a financial institution with which the client (enterprise) has an existing relationship. The request data 500 further includes an identifier (e.g., name or ID) of the enterprise 504, the name of the requesting administrator 506, the address of the enterprise 508, the number of meeting cards being requested 509, a credit limit 510 and cash advance limits 512 on the accounts, a velocity limit 514 which limits the number of transactions that may be performed using the account over a time span, and names or identifiers of users 516, 518 authorized to use the corporate meeting account to be issued. Merchant category code (MCC) controls can also be included to limit the use of the meeting card to a specific merchant or a group of merchants defined by the MCC, MCC range or a group of MCCs.

In addition, the SOAP request includes a certificate previously provided to client 102 (enterprise) by financial transaction facilitator 106 that is used is to authenticate the identity of client 102 to the financial transaction facilitator 106.

Returning to FIG. 4, in a second step 404, the meeting management application sends the card issuance request to the financial transaction facilitator 106 over network 104. More specifically, the SOAP request may be directed to a URL for accessing the card management module 108 executed at financial transaction facilitator 106. In step 406, the SOAP request is received by the card management module 108. The card management module 108 includes program code for executing certain operations upon receipt of SOAP messages from client computers. In step 408, the card management module 108 checks the validity of the sender of SOAP message by extracting the certificate from the SOAP message and authenticating the identity of the client computer 102. If it is determined in step 408 that the certificate is not valid, in step 409, card management module 108 sends back a notification of failure to authenticate to client computer 102. If, in step 408, it is determined that the certificate is valid (i.e., that the enterprise from which the request has been issued is registered with the card management module 108), in step 410, the card management module 108 determines whether the format of the SOAP request is valid. In some embodiments, the card management module 108 determines whether the format of the SOAP request matches the predetermined format of either 1) a corporate meeting account issuance request or 2) a corporate meeting account update request. This determination may be performed, for example, using well-known parsing techniques. If the format of the SOAP request matches either of the two valid formats, the card management module 108 processes the request according to the request type. For purposes of illustration, the SOAP request is taken to be a card issuance request, however, it is noted that the card management module 108 is adapted to process any updates to corporate meeting accounts available to managers using meeting management application 103.

Upon determining that the SOAP request conforms to the format of a card issuance request, in step 412 the card management module 108 extracts the data included in the request and stores the data in memory (e.g., temporarily) and determines the requested issuer identified in the request. In step 414, card management module 108 formulates a secondary card issuance request appropriate for sending to the identified issuer. The secondary card issuance request may employ a variety of formats and protocols (e.g., email, SMS, SOAP, etc.) and may make use of conventional message processing techniques used between financial transaction facilitators and issuers that participate in a financial service network for processing transactions performed using financial presentation devices. Thus, the 'back end' of the card management module 108, which interfaces with issuers, may operate in a different mode from the 'front end' (web service) of card management module 108 which interfaces with the meeting application 103.

As part of generating the secondary card issuance request in step 414, the management module 108 determines the message format protocol, transmission standard, encryption key and the like based on the identified issuer as each issuer may have a unique way to communicate with the transaction processor 106.

As the transaction facilitator 106 has a relationship with all of the issuers of credit and debit cards including meeting cards, the card management module 108 has a communication protocol and interface, and encryption keys that accommodates all of the issuers each of which may have a very specific and different protocol and message format with different encryption keys and even different encryption methods. However, according to an embodiment of the present invention, the meeting management application 103 only needs to issue a single standard message to request a meeting account without the need to know anything about the specific communication formats and protocols of individual issuers.

In step 416, the card management module 108 transmits the secondary card issuance request to the identified issuer 110 over network 112 from the financial transaction facilitator 106. Preferably, the secondary card issuance request is encrypted with the encryption key of the identified issuer.

Steps 418-426 are executed by an issuer computer. In step 418, the issuer 110 receives the secondary card issuance request from the financial transaction facilitator 106. In step 420, the issuer 110 extracts the request data from the secondary card issuance request, and in step 422 determines, based on information identifying the enterprise requesting the issuance of a new corporate meeting account, whether to issue the requested new corporate meeting account. In the determination process, the issuer 110 may use a variety of information including existing accounts it may have issued to the enterprise, the parameters of the account requested including the credit limit, the credit history of the enterprise, and policies and criteria established for issuing new accounts. The determination process is preferably automatic, but may involve the input of reviewing personnel. If issuer 110 decides to issue the requested corporate meeting account, in step 424, issuer 110 generates a new account number according to conventional issuance procedures known in the art, including the generation of a new account number, and preparation of financial presentation devices (e.g., credit or debit meeting cards) if requested. After a new corporate meeting account has been generated, issuer 110 sends the new corporate meeting account information to card management module 108 in step 426. In step 428, card management module 108 receives the new corporate meeting account information, and in step 430, sends a SOAP message back to meeting application 103 indicating that the card issuance request has been granted. In step 432, the SOAP message is received by meeting application 103 of client computer 102 and the meeting account identified in the received SOAP message is automatically associated with the meeting event without the user having to manually type in the financial account number. As a result, the process of obtaining a meeting account and card can be fully automated within the meeting management application 103 at the enterprise 102 without the need to manually fax or call the issuer.

It is again noted that update requests are handled in a similar manner. For example, a request to change a credit or velocity limit, or to add or remove listed authorized persons from an account, are handled by transmission of an update request from the meeting application to the card management module 108, which formulates a secondary update request appropriate for informing the issuer of the requested changes.

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

What is claimed is:

1. A computer-implemented method for managing issuance of a financial account for use in making purchases related to an event, the method comprising:
   receiving, by one or more computers, information corresponding to a plurality of financial account issuers each operating at least one financial account issuer computer;
   storing, by the one or more computers, the received information corresponding to the plurality of financial account issuers;
   providing, by the one or more computers, a communication interface that communicates over a communication channel;
   receiving, from an event-planning software package executing on a client computer, a request to issue a financial account;
   determining, by the one or more computers, that the received request has a data structure including a financial account issuer identifier, an enterprise identifier and at least one user identifier, wherein the enterprise identifier is distinct from the financial account issuer identifier and wherein the at least one user identifier is distinct from the enterprise identifier;
   based at least in part on the determination that the received request contains the enterprise identifier, identifying an enterprise that will control event expenditures with the requested financial account;
   based at least in part on the determination that the received request contains the at least one user identifier, identifying at least one user of the financial account;
   selecting, by the one or more computers, information corresponding to a financial account issuer from among the stored information corresponding to the plurality of financial account issuers based at least in part on the issuer identifier of the received request to issue a financial account; and
   sending, by the one or more computers, a subsequent request corresponding to the received request to the at least one financial account issuer computer of the financial account issuer corresponding to the selected information.

2. The method of claim 1, further comprising:
   receiving, from the at least one computer of the selected financial account issuer and through the communication interface, information identifying a new financial account in accordance with the sent request; and
   transmitting the received information identifying the new financial account to the event-planning software package.

3. The method of claim 1, further comprising:
   receiving, by the event-planning software package, input to set up the event from a user; and
   automatically generating, by the event-planning software package, the request to issue the financial account based at least in part on the received input.

4. The method of claim 3, further comprising:
   receiving, by the event-planning software package and from the management module, information identifying a new financial account based at least in part on the request to issue the financial account; and
   automatically associating, by the event-planning software package, the event with the new financial account.

5. The method of claim 1, determining whether the data structure of the request received from the event-planning software package further includes a specified credit limit for the financial account.

6. The method of claim 5, wherein the enterprise controls event expenditures with the financial account at least in part by specifying the credit limit for the financial account with the event-planning software package.

7. The method of claim 1, wherein:
   the plurality of financial account issuers require requests having a plurality of different data structures; and
   the method further comprises determining, from among the plurality of different data structures, a data structure for the request to be sent to the selected financial account issuer based at least in part on the issuer identifier in the data structure of the received request.

8. The method of claim 7, wherein the plurality of different data structures of the requests required by the plurality of financial account issuers are defined independent of the event-planning software package.

9. The method of claim 7, further comprising extracting at least the issuer identifier, the enterprise identifier and the at least one user identifier from the data structure of the received request and storing at least the issuer identifier, the enterprise identifier and the at least one user identifier in a memory storage device.

10. The method of claim 9, further comprising formulating the request to be sent to the selected financial account issuer based at least in part on the determined data structure, the extracted issuer identifier, the extracted enterprise identifier and the extracted at least one user identifier, wherein the formulating is different for each of the plurality of different data structures.

11. The method of claim 1, further comprising selecting an encryption key from among a plurality of different encryption keys based at least in part on the issuer identifier in the data structure of the received request and encrypting the request to be sent to the selected financial account issuer with the selected encryption key.

* * * * *